United States Patent [19]

Ozaki et al.

[11] Patent Number: 4,732,051
[45] Date of Patent: Mar. 22, 1988

[54] DUST PROTECTIVE MEMBER FOR BICYCLE FREEWHEEL ASSEMBLY

[75] Inventors: Nobuo Ozaki; Mamoru Nakai, both of Osaka, Japan

[73] Assignee: Aeda Industries, Ltd., Osaka, Japan

[21] Appl. No.: 832,886

[22] Filed: Feb. 26, 1986

[30] Foreign Application Priority Data

Feb. 26, 1985 [JP] Japan ............................. 60-27781[U]
Feb. 27, 1985 [JP] Japan ............................. 60-28712[U]

[51] Int. Cl.$^4$ .......................... G05G 1/08; G05G 1/14
[52] U.S. Cl. .................................. 74/594.1; 74/594.4; 384/458
[58] Field of Search ................. 74/594.1, 594.2, 594.7, 74/569, 594.4, 750 B; 308/3.5; 384/458, 489, 540

[56] References Cited

U.S. PATENT DOCUMENTS

| | | | |
|---|---|---|---|
| 2,323,912 | 7/1943 | Johnson | 74/594.7 |
| 3,551,004 | 12/1970 | Quisenberry | 74/594.1 |
| 3,578,829 | 5/1971 | Hata | 74/594.1 |
| 4,113,327 | 9/1978 | Koch | 74/569 |
| 4,323,146 | 4/1982 | Fukui | 74/750 B |
| 4,651,590 | 3/1987 | Thun | 74/594.1 |

FOREIGN PATENT DOCUMENTS 758296 1/1934 France ............................. 74/594.1
438952 9/1948 Italy ............................. 74/594.2

Primary Examiner—Gary L. Smith
Assistant Examiner—Vinh Luong
Attorney, Agent, or Firm—Birch, Stewart, Kolasch, & Birch

[57] ABSTRACT

A bicycle freewheel assembly comprising a hollow external body relatively rotatable with and radially spaced apart from a hollow internal body, a first dust protective member including a horizontal tubular body and an annular vertical flange and secured to the alternative of the internal body or the external body at one side of the the freewheel assembly, a second dust protective member including a horizontal tubular body and an annular vertical flange and secured to the alternative of the external body or a lock nut mounted on the internal body at the other side of the freewheel assembly, a first narrow clearance formed between the first dust protective member and the alternative of the internal body or the external body at the one side of the freewheel assembly, a second narrow clearance formed between the second dust protective member and the alternative of the external body or the lock nut at the other side of the freewheel assembly, and each of the first and the second clearances being L-shaped or hook-shaped to minimize undesirable intrusion of dust and/or rain into the inside of the freewheel assembly.

4 Claims, 4 Drawing Figures

DUST PROTECTIVE MEMBER FOR BICYCLE FREEWHEEL ASSEMBLY

BACKGROUND AND SUMMARY OF THE INVENTION:

This invention relates to an improvement in a bicycle freewheel assembly, and more particularly to protection of the freewheel assembly from dust and rain.

In general, a bicycle freewheel hub includes a hollow internal body and a hollow external body. The internal body is mounted on a rear wheel hub of a bicycle for corotation therewith. The external body, on which one or more sprocket are mounted, is relatively rotatable with respect to the internal body with the aid of a pair of bearing mechanism interposed therebetween. A ratchet mechanism is interposed between the internal body and the external body so that a driving force produced by a cyclist's forward pedalling is transmitted via a drive chain, the sprocket and the external body to the internal body and so that the external body is free from corotation with the internal body during the cyclist's back pedalling. Thus, the external body is radially spaced apart from the internal body to form an internal space for accommodating the pair of bearing mechanisms and the ratchet mechanism.

Therefore, dust and/or rain intrude into the inside of the freewheel assembly through a gap between the external body and the internal body thereby to cause deterioration in function of the bearing mechanisms and the ratchet mechanism. It may appear that such problem can be easily solved by provision of a suitable cover to seal the gap between the external body and the internal body. However, the problem is, in fact, not so simple because the external body must be relatively rotatable with respect to the internal body and because there are strict dimensional restrictions with respect to various portions of the external body and also those of the internal body if the freewheel assembly is designed to meet the requirements of International Industrial Standard and/or Japanese Industrial Standard.

Under such situations, a bicycle freewheel provided with a satisfactory means for preventing the intrusion of dust and/or rain into the gap between the external body and the internal body is not available at present in the commercial market.

It is, therefore, an object of the invention is to provide an improved bicycle freewheel assembly provided with a protective arrangement for minimizing undesirable intrusion of dust and/or rain into the inside of the bicycle freewheel assembly.

Another object of the invention is to provide an improved bicycle freewheel assembly provided with the above mentioned protective arrangement without any substantial change in dimension of the freewheel assembly.

Other objects, features and advantages of the invention will become apparent from the following detailed description.

According to the invention, there is provided a bicycle freewheel assembly comprising a hollow external body relatively rotatable with and radially spaced apart from a hollow internal body, a first dust protective member including a horizontal tubular body and an annular vertical flange and secured to the alternative of the internal body or the external body at one side of the the freewheel assembly, a second dust protective member including a horizontal tubular body and an annular vertical flange and secured to the alternative of the external body or a lock nut mounted on the internal body at the other side of the freewheel assembly, a first narrow clearance formed between the first dust protective member and the alternative of the internal body or the external body at the one side of the freewheel assembly, a second narrow clearance formed between the second dust protective member and the alternative of the external body or the lock nut at the other side of the freewheel assembly, and each of the first and the second clearances being L-shaped or hook-shaped to minimize undesirable intrusion of dust and/or rain into the inside of the freewheel assembly.

Figure 1:
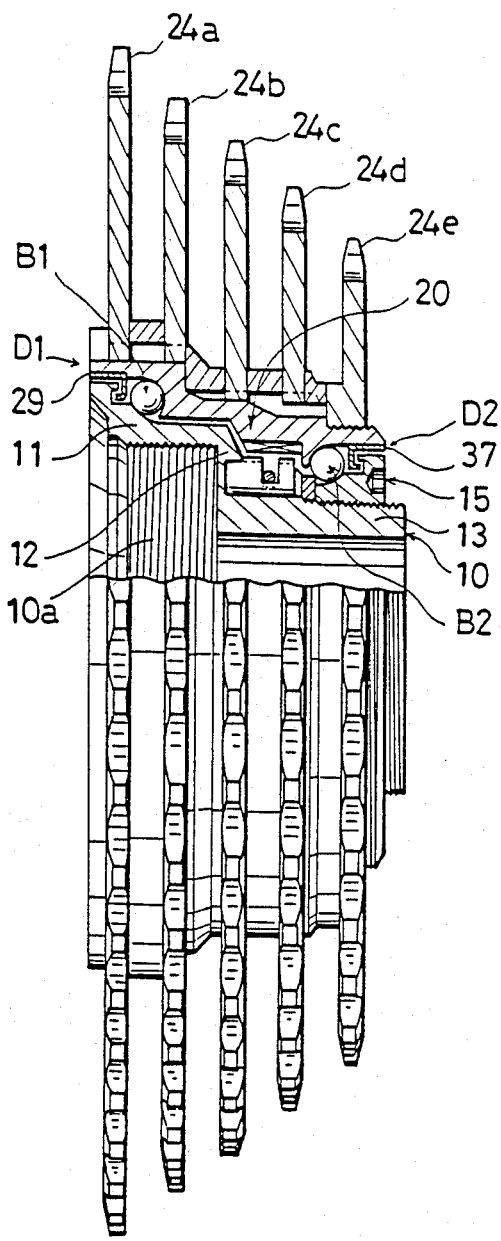
FIG. 1 is a front elevation, with parts broken away, of a freewheel assembly according to the present invention.

DESCRIPTION OF THE PREFERRED EMBODIMENTS:

Referring now to the accompanying drawings, identical reference numerals are used throughout FIGS. 1 to 4 to indicate various elements and parts which are substantially identical in function.

Figure 2:
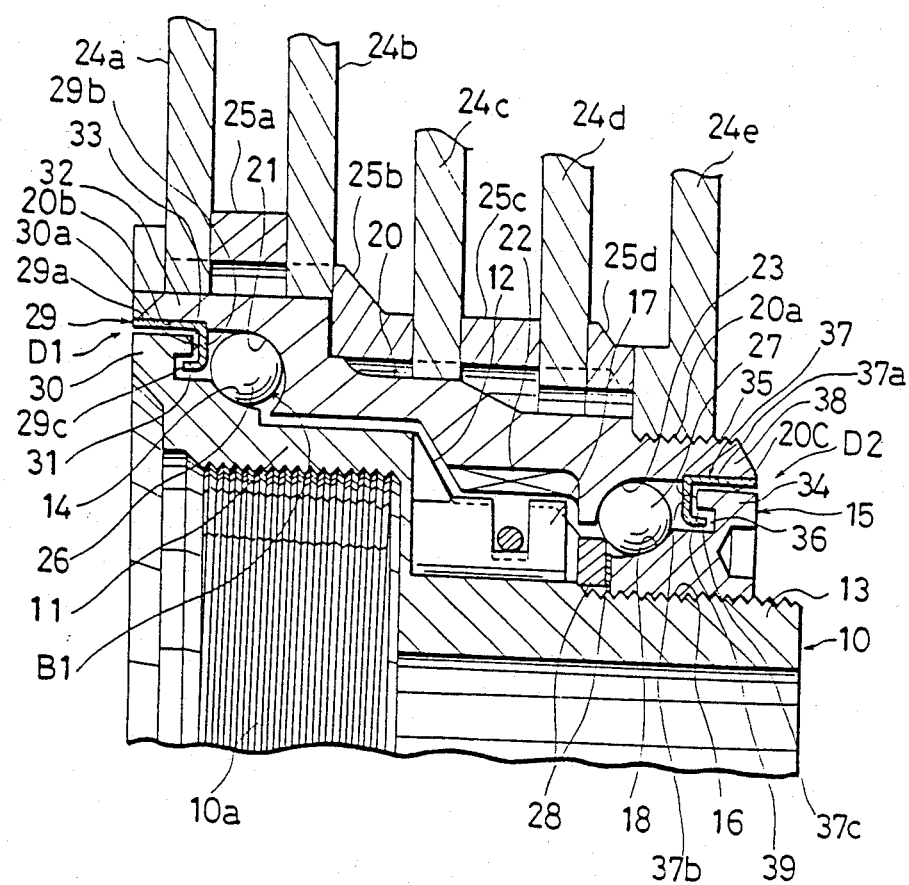
FIG. 2 is an enlarged fragmentary section of the FIG. 1, illustrating the parts featuring the invention.

FIGS. 1 and 2 illustrate a first embodiment of the invention, wherein the bicycle freewheel assembly of the invention is illustrated as having a hollow internal body 10 to be screwed onto a bicycle hub (not shown) by threads 10a. A hollow external body 20 is relatively rotatably supported on the internal body 10 by means of bearings interposed therebetween as will be described hereinafter. The internal and the external bodies 10, 20 are radially spaced apart from one another, conventionally.

In the illustrated embodiment, the internal body 10 includes a diametrically enlarged section 11, an intermediate section 12 and a diametrically reduced section 13. The enlarged section 13 is formed with a first bearing surface 14 which is opposed to and cooperates with a third bearing surface 21 of the external body 20 so that a first series of steel balls 26 are interposed between the bearing surfaces 14, 21 to permit relative rotation of the external body 20 with the internal body 10. Thus, the bearing surfaces 14, 21 and the steel balls 26 provide a first bearing mechanism B1.

The intermediate section 12 has a series of ratchet pawls 17 embedded therein for engagement with ratchet teeth 22 formed internally of the external body 10, so that one way drive force is transmitted from the external body 20 to the internal body 10, conventionally.

The reduced section 13 is formed with external threads 16 for screwable engagement with a lock nut 15.

The lock nut 15 is formed with a second bearing surface 18 which is opposed to a fourth bearing surface 23 of the external body 20 so that a second series of steel balls 27 are interposed between the bearing surfaces 18, 23 for the same purpose as of the first series of steel balls 26. The bearing surfaces 18, 23 and the steel balls 27 provide a second bearing mechanism B2.

A plurality of sprocket wheels 24a, 24b, 24c, 24d, 24e, which are different in diameter to each other, are mounted on the external body 20 in order of diameter so as to be corotatable with the external body 20. The sprockets are spaced from each other by means of spacers 25a, 25b, 25c, 25d, conventionally. In the illustrated embodiment, the sprockets 24a to 24d are coupled with the external body 20 by means of known splines while the smallest sprocket 24e is screwed onto a diametrically reduced end portion 38 of the same body 20 by threads 20a.

Incidentally, reference numeral 28 designates spacer washers which are interposed between an outward annular vertical wall of the intermediate section 12 and an inner end wall of the lock nut 15.

The above-described structural elements and arrangement thereof are known and do not feature the present invention. It is to be noted that the invention should not be limited to the specific structures and arrangements of the described elements because they are described and illustrated by way of example only. It is also to be noted that the invention is applicable not only to the illustrated multiple freewheel assembly but also to a single freewheel assembly having only one sprocket. The features of the invention reside in the following first and second dust protective arrangements D1, D2 for the bicycle freewheel assembly.

According to the first embodiment of the invention, a first dust protective arrangement D1 includes a diametrically large cylindrical portion 30 of the section 10 having an internal vertical annular wall 30a facing axially inwardly of the freewheel assembly. A cylindrical groove 31 is formed in the vertical wall 30a. The groove 31 may preferably be square or substantially square in cross section.

A first dust protective member 29 is fixed to an internal cylindrical wall of a diametrically large portion 32 of the external body 20 by press-fitting a tubular body 29a of the member 29 into one opening mouth 20b of the external body 20. If required, the tubular body 29a may be embedded in the internal wall of the portion 32 of the external body 20, as illustrated in FIG. 2.

The protective member 29 has a vertical annular flange 29b formed at the innermost end of the tubular body 29. The annular flange 29b is formed with a short tubular extension 29c which is directed axially outwardly of the freewheel assembly to extend into the groove 31.

The first protective member 29 is not in contact with any portion of the internal body 10, so that a substantially hook-shaped narrow clearance 33 is provided between the member 29 and the diametrically largest portion 30 of the internal body 10. Thus, the protective member 29 does not prevent the relative rotation of the external body 20 with the internal body 10.

The second dust protective arrangement D2 includes an axially outermost portion 34 of the lock nut 15 having an internal vertical annular end wall 35 facing axially inwardly of the freewheel assembly. A cylindrical groove 36 is formed in the vertical end wall 35. The groove 36 may preferably be square or substantially square in cross section.

A second dust protective member 37 is fixed to an internal cylindrical wall of the diametrically reduced end portion 38 of the external body 20 by press-fitting a tubular body 37a of the member 37 into the other opening mouth 20c of the external body 20. If required, the tubular body 37a may be embedded in the internal wall of the end portion 38. The second protective member 37 has a vertical internal annular flange 37b formed at the innermost end of the tubular body 37a. The annular flange 37b is formed with a short tubular extension 37c which is directed axially outwardly of the freewheel assembly to extend into the groove 36.

The second protective member 37 is also not in contact with any portion of the lock nut 15, so that a substantially hook-shaped narrow clearance 39 is provided between the second protective member 37 and the lock nut 15. Thus, the protective member 37 does not prevent the relative rotation of the external body 20 with the lock nut 15.

Figure 3:
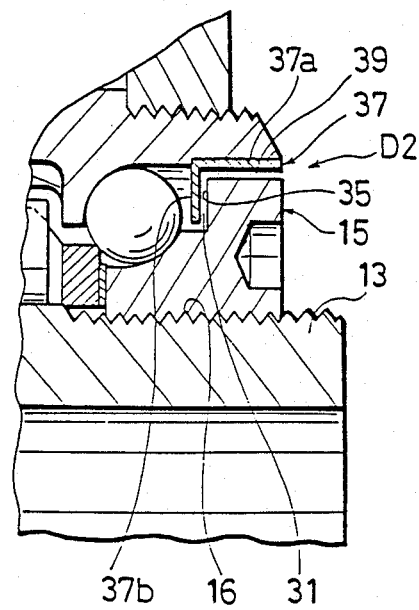
FIG. 3 is an enlarged fragmentary section of a modified embodiment of the invention.

FIG. 3 illustrates a second embodiment of the invention, wherein the second dust protective arrangement D2 is more simplified than that in the first embodiment. More particularly, the second protective member 37 is formed into a L-shaped configuration in cross section, having the tubular body 37a and the flange 37b, wherein the short tubular extension 37c of the first embodiment is omitted, while the vertical annular end wall 35 is not formed with any groove in contrast to the first embodiment. Accordingly, an L-shaped clearance 39 is provided between the protective member 37 and the lock nut 15. This second embodiment is advantageous from the viewpoint of manufacturing cost.

It is apparent that the first dust protective arrangement D1 in the first embodiment may also be modified into a similar arrangement to the above-described arrangement D2, by simply replacing the hook-shaped protective member 29 by the L-shaped protective member similar to the member 37 and also by omitting the groove 31.

Figure 4:
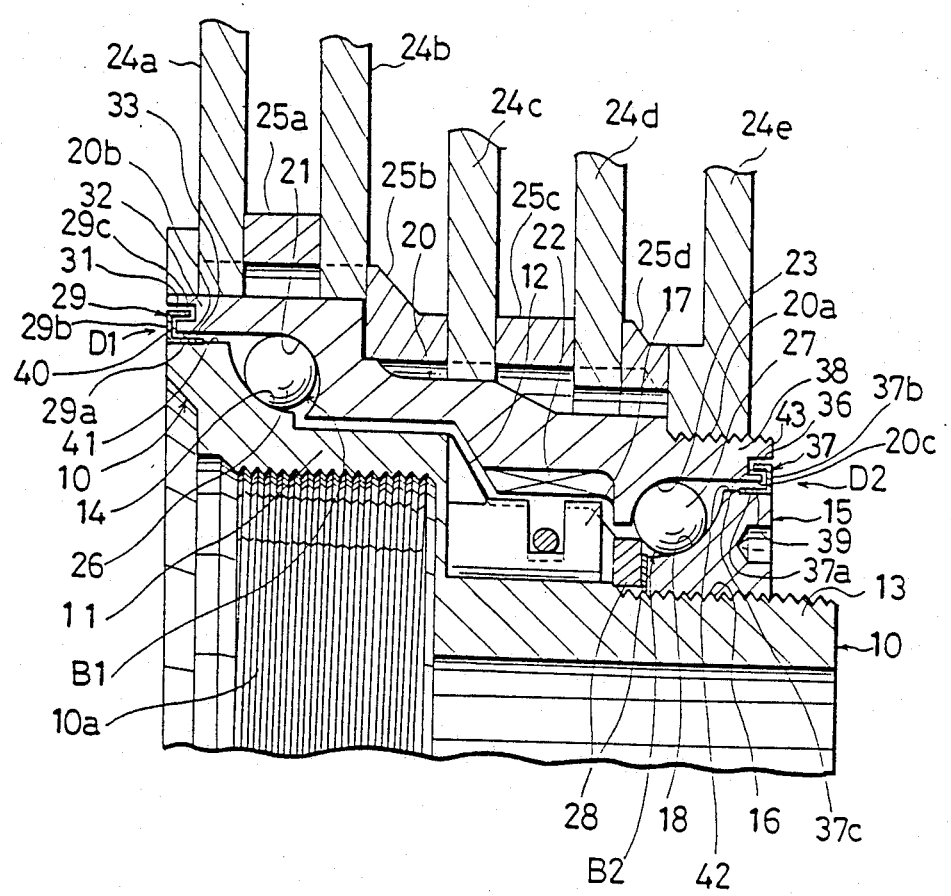
FIG. 4 is a similar view to FIG. 2, but showing another modified embodiment of the invention.

FIG. 4 illustrates a third embodiment of the invention, wherein the first and the second protective members 29, 37 are mounted onto the internal body 10 while the grooves 31, 36 are formed in the external body 20.

More specifically, the first dust protective arrangement D1 has the first groove 31 formed in an external annular vertical end wall 40 of the diametrically largest portion 32 of the external body 20, and the first hook-shaped protective member 29 is fixed to an external cylindrical wall 41 of the diametrically largest portion of the internal body 10 by press-fitting the tubular body 29a of the member 29 onto the wall 41. The short cylindrical extension 29c of the member 29 extends from the flange 29b into the first groove 31 to cover the clearance 33 between the tubular body 29a and the internal wall 20b of the external body 20.

The second dust protective arrangement D2 has the second groove 36 formed in an external vertical annular and wall 43 of the diametrically reduced end portion 38 of the external body 20, and the second hook-shaped protective member 37 is fixed to an external cylindrical wall 42 of the lock nut 15 by press-fitting the tubular body 37a of the member 37 onto the wall 42. The short cylindrical extension 37c of the member 37 extends from the flange 37b into the second groove 36 to cover the clearance 39 between the tubular body 37a and the internal wall 20c of the external body 20.

The first and second protective members 29, 37 are not in contact with any portion of the external body 20, resulting in that the protective members 29, 37 do not prevent the relative rotation of the external body 20 with respect to the internal body 10.

It is obvious that any one or both of the first and second hook-shaped members 29, 37 may be replaced by the L-shaped members similar to those employed in the above-described second embodiment.

In operation, since each of the clearances 33, 39 is crooked at least one portion thereof, dust and/or rain is difficult to reach the bearing mechanisms B1, B2, whereby deterioration in bearing function is prevented. Especially when the internal body 10 is in rotation, centrifugal forces are developed to prevent radial intrusion of dust and/or rain into the clearances 33, 39. Thus, the specific arrangements D1, D2 according to the invention can minimize the undesirable intrusion of dust and/or rain into the inside of the freewheel assembly without any adverse effect to smooth relative rotation of the external body 20 with respective to the internal body 10.

The invention being thus described, it will be obvious that same may be varied in many ways. Such variations are not to be regarded as a departure from the spirit and scope of the invention, and all such modifications as would be obvious to one skilled in the art are intended to be included within the scope of the following claims.

We claim:
1. A bicycle freewheel assembly comprising:
   a hollow external body rotatable relative to and radially spaced apart from a hollow internal body;
   said external body having one end section formed with an internal cylindrical face;
   said internal body having one end section formed with an external cylindrical face opposed to said internal cylindrical face, and with an axially inwardly directed, annular vertical face extending radially inwardly from said external cylindrical face;
   said annular vertical face being formed with a cylindrical groove;
   a dust protective member having a horizontal tubular body secured to said internal cylindrical face in parallel thereto, an annular vertical flange extending radially inwardly from said tubular body in opposed relation to said annular vertical face, and a tubular extension extending axially outwardly from said annular vertical flange into said cylindrical groove; and
   said dust protective member being spaced in its entirety from said internal body to form therebetween a labyrinth clearance extending along said external cylindrical face, said annular vertical face and said cylindrical groove.

2. A bicycle freewheel assembly comprising:
   a hollow external body rotatable relative to and radially spaced apart from a hollow internal body;
   said external body having one end section formed with an internal cylindrical face;
   a lock nut mounted on one end section of said internal body;
   said lock nut having an external cylindrical face opposed to said internal cylindrical face, and with an axially inwardly directed, annular vertical face extending radially inwardly from said external cylindrical face;
   said annular vertical face being formed with a cylindrical groove;
   a dust protective member having a horizontal tubular body secured to said internal cylindrical face in parallel thereto, an annular vertical flange extending radially inwardly from said tubular body in opposed relation to said annular vertical face, and a tubular extension extending axially outwardly from said annular vertical flange into said cylindrical groove; and
   said dust protective member being spaced in its entirety from said lock nut to form therebetween a labyrinth clearance extending along said external cylindrical face, said annular vertical face and said cylindrical groove.

3. A bicycle freewheel assembly comprising:
   a hollow external body rotatable relative to and radially spaced apart from a hollow internal body;
   said internal body having one end section formed with an external cylindrical face;
   said external body having one end section formed with an internal cylindrical face opposed to said external cylindrical face, and with an annular vertical end face extending radially outwardly from said internal cylindrical face;
   said annular vertical end face being formed with a cylindrical groove;
   a dust protective member having a horizontal tubular body secured to said external cylindrical face in parallel thereto, an annular vertical flange extending radially outwardly from said tubular body in opposed relation to said annular vertical end face, and a tubular extension extending axially inwardly from said annular vertical flange into said cylindrical groove; and
   said dust protective member being spaced in its entirety from said external body to form therebetween a labyrinth clearance extending along said internal cylindrical face, said annular vertical end face and said cylindrical groove.

4. A bicycle freewheel assembly comprising:
   a hollow external body rotatable relative to and radially spaced apart from a hollow internal body;
   a lock nut mounted on one end section of said internal body and having an external cylindrical face;
   said external body having one end section formed with an internal cylindrical face opposed to said external cylindrical face, and with an annular vertical end face extending radially outwardly from said internal cylindrical face;
   said annular vertical end face being formed with a cylindrical groove;
   a dust protective member having a horizontal tubular body secured to said external cylindrical face in parallel thereto, an annular vertical flange extending radially outwardly from said tubular body in opposed relation to said annular vertical end face, and a tubular extension extending axially inwardly from said annular vertical flange into said cylindrical groove; and
   said dust protective member being spaced in its entirety from said external body to form therebetween a labyrinth clearance extending along said internal cylindrical face, said annular vertical face and said cylindrical groove.

* * * * *